(12) United States Patent
Moulsley et al.

(10) Patent No.: US 8,270,534 B2
(45) Date of Patent: Sep. 18, 2012

(54) METHOD AND APPARATUS FOR SIGNAL QUALITY ESTIMATION

(75) Inventors: Timothy J. Moulsley, Caterham (GB); Matthew P. J. Baker, Canterbury (GB)

(73) Assignee: ST-Ericsson SA, Plan-les-Ouates (CH)

( * ) Notice: Subject to any disclaimer, the term of this patent is extended or adjusted under 35 U.S.C. 154(b) by 788 days.

(21) Appl. No.: 11/816,100

(22) PCT Filed: Feb. 9, 2006

(86) PCT No.: PCT/IB2006/050420
§ 371 (c)(1),
(2), (4) Date: May 16, 2008

(87) PCT Pub. No.: WO2006/085275
PCT Pub. Date: Aug. 17, 2006

(65) Prior Publication Data
US 2009/0016472 A1  Jan. 15, 2009

(30) Foreign Application Priority Data

Feb. 10, 2005 (EP) .................................. 05100962
Jun. 21, 2005 (EP) .................................. 05105509

(51) Int. Cl.
*H04L 27/00* (2006.01)
(52) U.S. Cl. ........ 375/316; 375/238; 375/239; 375/242; 375/256; 375/257; 375/375; 375/286; 375/353
(58) Field of Classification Search .................. 375/316, 375/346, 260, 267, 320, 340
See application file for complete search history.

(56) References Cited

U.S. PATENT DOCUMENTS

| | | | |
|---|---|---|---|
| 4,234,954 A | 11/1980 | Lange et al. | |
| 5,214,687 A | 5/1993 | Kansakoski et al. | |
| 5,852,630 A * | 12/1998 | Langberg et al. | 375/219 |
| 6,614,851 B1 * | 9/2003 | Dehghan et al. | 375/261 |
| 6,950,841 B2 * | 9/2005 | Challa et al. | 708/277 |
| 7,620,123 B2 * | 11/2009 | Li et al. | 375/320 |
| 2002/0172302 A1 | 11/2002 | Monogioudis et al. | |

(Continued)

FOREIGN PATENT DOCUMENTS

EP    1 235 379 A1    8/2002

(Continued)

OTHER PUBLICATIONS

Kostas Kokkinakis and Asike Nadi, "Multichannel Speech Seperation Using Adaptive Paramterization of Source PDFs" C.G. Puntonet and A Prieto : ICA 2004, LNCS 3195, pp. 486-493, 2004.*

(Continued)

*Primary Examiner* — Dhaval Patel
(74) *Attorney, Agent, or Firm* — Potomac Patent Group PLLC (57) ABSTRACT

A receiver (13) of user equipment, UE, (10) of a Universal Mobile Telecommunications System, UMTS, network receives a digitally encoded radio signal over a downlink (11) from a base station (12). A Digital Signal Processor, DSP, (14) of the UE (10) estimates BER of data bits of power control commands received in the signal during an out of synchronisation procedure. More specifically, the DSP (14) samples the amplitude with which the data bits are received and determines a ratio of functions of one or more moments of the sampled amplitudes. The DSP (14) then compares the determined ratio to one or more values of BER for different ratios in a look-up table to estimate BER.

37 Claims, 6 Drawing Sheets

U.S. PATENT DOCUMENTS

2002/0181621 A1    12/2002  Bohnhoff et al.
2005/0008103 A1*   1/2005   Sternberg et al. ............ 375/340

FOREIGN PATENT DOCUMENTS

| JP | 2002-094405 A | 3/2002 |
|----|---------------|--------|
| JP | 2004-538720 T | 12/2004 |
| JP | 2005-538617 T | 12/2005 |
| WO | 99/40689 A1 | 8/1999 |
| WO | 03/015364 A1 | 2/2003 |
| WO | 2004/023672 A1 | 3/2004 |
| WO | 20041045118 A2 | 5/2004 |

OTHER PUBLICATIONS

Japan Patent Office, Office Action in JP 2007-554715, received by associate May 15, 2012.

* cited by examiner

METHOD AND APPARATUS FOR SIGNAL QUALITY ESTIMATION

This invention relates to a method and apparatus for signal quality estimation. More particularly, but not exclusively, the invention relates to the estimation of bit error rate (BER) of a signal using statistical properties of the magnitudes with which symbols of the signal are received.

One way of estimating the quality of a digital signal is to measure its bit error rate (BER), which is basically the fraction of bits in the signal that are incorrect. Clearly, if the expected values of each of the bits in the signal are known, the actual values in the signal can be compared to the expected values and BER can be measured precisely. This technique is sometimes used in communications systems during establishment of a new communications link and typically involves transmitting a known sequence of bits, often called pilot bits, to a receiver, on the basis of which an appropriate comparison can be made. However, it is often impractical to carry out a bit by bit comparison of a received signal to a known sequence of pilot bits, as suitable pilot bits may not be available. Furthermore, the relationship between the (measurable) BER of the pilot bits and the BER of data bits of the signal for which it is required to determine BER may be unknown.

Other techniques have therefore been developed to estimate BER. Many of these rely on statistical analysis of the magnitudes with which symbols of a signal are received. For example, it can be shown that for a Binary Phase-Shift Keyed (BPSK) signal in the presence of Additive White Gaussian Noise (AWGN)

$$BER = \frac{1}{2}\left(1 - \text{erf}\left(\frac{\mu}{\sigma\sqrt{2}}\right)\right) \qquad (1)$$

where erf is the error function obtained by integrating a normal distribution; $\mu$ is the mean amplitude at which bits of the signal are received in the signal; and $\sigma$ is the standard deviation of the amplitude. It is common to use an estimate of the amplitude at which it is expected to receive the data bits in the signal as the mean amplitude $\mu$. Similarly, the standard deviation $\sigma$ of the amplitude can be assumed to be equal to the square root of the noise power affecting the signal, i.e. the noise power can be equal to $\sigma^2$. So, if the amplitude at which the data bits are expected to be received and the noise power affecting the signal can be estimated accurately, a good estimate of BER can be made using equation (1) fairly straightforwardly. However, this type of BER estimation is not always possible. For example, in a Universal Mobile Telecommunications System (UMTS) network, it is necessary for user equipment to determine the BER of power control commands received in a downlink from a base station, but the amplitude at which bits of the power control commands are expected to be received and the noise power affecting the power control commands are not always known. So, it is not possible to use the relationship defined in equation (1) to determine BER.

Attempts have therefore been made to use more sophisticated statistical analysis of magnitudes with which symbols of signals are received to determine BER or otherwise estimate signal quality. These tend to rely on complex functions of the magnitudes. Generally, the more sophisticated the statistical analysis, the more accurate the signal quality estimation becomes, but the more computationally complex the quality estimation tends to be. So, at present, accurate signal quality estimations can be difficult to implement in practice.

The present invention seeks to overcome this problem.

According to a first aspect of the present invention, there is provided an apparatus for estimating signal quality, the apparatus comprising: a receiver for sampling magnitudes with which symbols of a signal are received; and a processor for determining a ratio $F_1/F_2$ where $F_1$ and $F_2$ are each a function of one or more moments of the sampled magnitudes and $F_1$ and $F_2$ are non-identical, and for estimating signal quality from the determined ratio.

Also, according to a second aspect of the present invention, there is provided a method of estimating signal quality, the method comprising: sampling magnitudes at which symbols of a signal are received; determining a ratio $F_1/F_2$ where $F_1$ and $F_2$ are each a function of one or more moments of the sampled magnitudes and $F_1$ and $F_2$ are non-identical; and estimating signal quality from the determined ratio.

So, a signal quality estimation can be based on a ratio between functions of one or more moments of the sampled magnitudes of symbols in a received signal. The applicants have recognised that this can provide a reliable signal quality estimate. At the same time, such a ratio can be relatively straightforward to derive.

In one embodiment $F_1$ is a function $F_1[M_i]$ of one moment $M_i$ of the sampled magnitudes, where i is the order of the one moment $M_i$, and $F_2$ is a function $F_2[M_j]$ of another moment $M_j$ of the sampled magnitudes, where j is the order of the another moment $M_j$, and $i \neq j$.

In one embodiment $F_i[M_i]=M_i^{k/i}$ and $F_j[M_j]=M_j^{k/j}$ where k is any real number. In particular, the ratio may be between one moment calculated from sampled magnitudes of symbols in the received signal and another moment also calculated from the sampled magnitudes, e.g. a ratio between two moments of the magnitudes.

Optionally $M_i$ is computed as the expectation value of the ith power of the signal and $M_j$ is computed as the expectation value of the jth power of the signal.

At least one of $F_1$ and $F_2$ may include a normalisation factor.

In one embodiment it is preferred that the moments in the functions $F_1$ and $F_2$ are either both even order moments or both odd order moments. It is particularly preferred that the ratio is between the second order moment and the fourth order moment of the sampled magnitudes.

It can be beneficial to change the moments on which the ratio is based. For example, as ratios between functions of odd ordered moments are more beneficial when the distribution of the sampled magnitudes is asymmetric, it may be desirable to select a ratio between functions of odd ordered moments when the distribution is asymmetric. More generally, the processor may vary the order of at least one of the moments according to a degree of asymmetry of a distribution of the sampled magnitudes. Likewise, the method may include varying the order of at least one of the moments according to a degree of asymmetry of a distribution of the sampled magnitudes. The degree of asymmetry of the distribution can be determined from a value of single odd order moment of the distribution or a value of a ratio between an odd order moment and an even order moment of the distribution for example.

Similarly, the applicants have recognised that ratios between functions of some order moments can produce more accurate signal quality estimations in some circumstances than ratios between functions of other order moments. For example, ratios between functions of moments having higher difference in order tend to allow more accurate signal quality estimations as signal quality improves. More generally, the processor may therefore vary the order of at least one of the moments according to the estimated signal quality. Likewise, the method may include varying the order of at least one of the moments according to the estimated signal quality.

The ratio may be used as an estimation of signal quality as it stands. So, the signal quality estimation may comprise outputting the ratio. However, in other examples, it may be desirable to represent signal quality as a particular parameter defining the quality of the signal. In other words, the processor may estimate signal quality by deriving a value for a signal quality parameter from the ratio. Likewise, the signal quality estimation may comprise deriving a value for a signal quality parameter from the ratio. One way of doing this is to compare the ratio to a look-up table of parameter values. In other words, the apparatus may comprise a look-up table of signal quality parameter values for different ratios and the processor may derive the signal quality parameter value by comparing the derived ratio to one or more of the ratios in the look-up table. Likewise, the signal quality parameter derivation may comprise comparing the derived ratio to one or more ratios in a look-up table of signal quality parameter values for different ratios. The comparison may include interpolating between signal quality parameter values in the look-up table to derive the signal quality parameter value. The values may also be logarithmic in some examples, as this can improve the accuracy of interpolation for example.

The parameter might be any of a number of different recognised signal quality parameters. However, it is particularly preferred that the parameter is bit error rate (BER). In other examples, the parameter may be signal to noise ratio (SNR), block error rate (BLER) or packet error rate (PER). These are all well used and useful parameters. In another example, the parameter may be an error rate of a combined group of bits or symbols.

The symbol sampling typically involves sampling the magnitude of a stream of samples. To be more specific, it is preferred that the receiver samples the magnitude of all the symbols of a stream of symbols in the signal. Similarly, it is preferred that the method comprises sampling the magnitude of all the symbols of a stream of symbols in the signal. Usually, the receiver samples the magnitude of symbols received during a period of time. Similarly, the method comprises sampling the magnitude of symbols received during a period of time. The distribution can then relate to the symbols received during the period of time.

The longer the period of time, the more accurate the signal quality estimation is likely to be. However, the use of a longer sampling period causes a longer delay before the signal quality estimate is available. Selecting the length of the sampling period is therefore necessarily a trade off between these conflicting factors. However, it may be useful to increase the period of time as the estimated signal quality is likely to decrease. This might be based on a prediction of when estimated signal quality is likely to decrease. However, more straightforwardly, the period of time can be increased as signal quality (actually) decreases. More generally, the processor can vary the period of time according to the estimated signal quality. Likewise, the method can comprise varying the period of time according to the estimated signal quality. This can help to maintain the reliability of the signal quality estimate.

In the preceding description of the invention it is assumed that the received data symbol amplitude has been normalised to unity in order that the ratio of functions of moments does not depend on the signal amplitude. Alternatively, normalisation can also be included when the ratio of functions of moments is calculated.

The invention is implemented most straightforwardly in communications systems using binary modulation schemes, such as Binary Phase Shift Keying (BPSK) or Quadrature Phase Shift Keying (QPSK) (which is a combination of two orthogonal BPSK streams). Here, the symbols are typically bits. However, the invention is not limited to this and can be applied to other, e.g. higher order, modulation schemes, such as 16 Quadrature Amplitude Modulation (16-QAM) in which the symbols represent bits (according to a mapping scheme). In some examples, the symbols may comprise groups of bits. These groups of bits might be combined by an initial processing and/or decoding stage. The combining might comprise soft-combining, e.g. using Maximal Ratio Combining (MRC).

Similarly, the invention is most straightforwardly implemented in modulation schemes that directly represent symbols using amplitude. In this case the sampled magnitude can be amplitude, e.g. the absolute amplitude of a symbol. However, the invention is not limited to this and can be applied to differential modulation schemes. In this case, the sampled magnitude may be the difference in amplitude between two succeeding symbols of the signal for example. The invention may also be applied to phase modulation schemes, in which case the sample magnitude may be a measure of signal phase. In another example, the signal may be processed to generate the symbols. For example, a signal modulated with a given modulation scheme may be processed to form a stream of symbols in a simpler modulation scheme, such as binary modulation.

Use of the word "processor" above is intended to be general rather than specific. Whilst some aspects of the invention may be carried out using an individual processor, such as a digital signal processor (DSP) or central processing unit (CPU), they could equally well be carried out in other parts or components of the device. For example, a Radio Frequency (RF) unit may include some processing functionality and/or the device may include multiple processors for carrying out different features of the invention. Similarly, the invention could be implemented using a hard-wired circuit or circuits, or by embedded software. For example, the invention may be implemented using complementary metal oxide semiconductor (CMOS) circuitry. The word "processor" is therefore intended to be functional rather than literal and should be considered to include the terms "processors", "processing means", "circuit" or "circuits" as appropriate.

It can also be appreciated that the invention can be implemented using computer program code. According to a further aspect of the present invention, there is therefore provided computer software or computer program code adapted to carry out the method described above when processed by a processing means. The computer software or computer program code can be carried by a computer readable medium. The medium may be a physical storage medium such as a Read Only Memory (ROM) chip. Alternatively, it may be a disk such as a Digital Versatile Disk (DVD-ROM) or Compact Disk (CD-ROM). It could also be a signal such as an electronic signal over wires, an optical signal or a radio signal such as to a satellite or the like. The invention also extends to a processor running the software or code, e.g. a computer configured to carry out the method described above.

Preferred embodiments of the invention will now be described, by way of example only, with reference to the accompanying drawings, in which.

Figure 1:
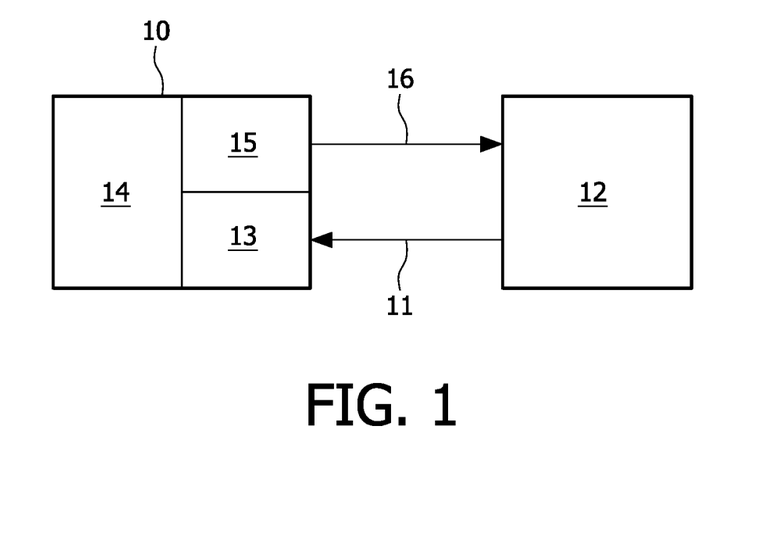
FIG. 1 is a schematic illustration of a radio communication system incorporating a receiver for implementing the invention.

Referring to FIG. 1, a mobile terminal or user equipment (UE) 10 of a Universal Mobile Telecommunications System (UMTS) network receives digitally encoded radio signals over a downlink 11 from a base station 12. The UE 10 has a receiver 13 for receiving signals over the downlink 11. The receiver 13 is arranged to filter the signal and shift it to baseband, as conventional, and to pass the filtered baseband signal to a Digital Signal Processor (DSP) 14 of the UE 10 for processing the signal. The UE 10 also has a transmitter 15 for transmitting signals back to the base station 12 over an uplink 16.

During an out of synchronisation procedure, the UE 10 is required to switch off its transmitter 15 if it loses synchronisation with the base station 12 over the downlink 11. The UE 10 receives data bits of power control commands from the base station 12 over the downlink 11. It is required to determine that it has lost synchronisation with the base station 12 over the downlink 11 based on the bit error rate (BER) of the received power control commands. The UE 10 must therefore determine the BER of the power control commands. As discussed in the introduction to the specification, bit error rate (BER) can be estimated from equation (1) above, if the expected received amplitude $\mu$ of data bits of the power control commands and the level of noise power $\sigma^2$ affecting the power control commands are known. However, the expected received amplitude $\mu$ of data bits of the power control commands and the level of noise power $\sigma^2$ affecting the power control commands are not necessarily known for the power control commands of the UMTS downlink 11.

Figure 2:
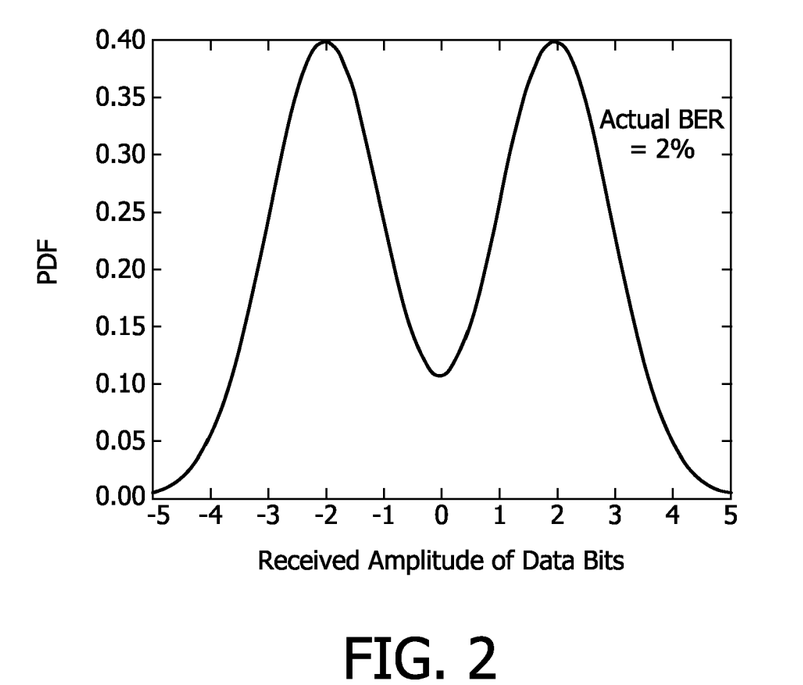
FIG. 2 is a graphical illustration of a Probability Density Function (PDF) of sampled amplitudes of data bits received over the communication system of FIG. 1 with a Bit Error Rate (BER) of 2%.

Nonetheless, if we assume that the noise affecting the received data bits is approximately Gaussian; that there are an equal number of +1 and −1 data bits (which is typically reasonable over a sufficient time period); and that the +1 and −1 data bits are transmitted with the same power, then the amplitude of the data bits received by UE 10 has a Probability Density Function (PDF) approximately equal to the sum of two individual Gaussian PDFs, as shown in FIG. 2 for an actual BER of 2%. More specifically, the PDF of the amplitude of the data bits can be written $$p_x = \frac{1}{2\sigma\sqrt{2\pi}}\left(e^{\frac{-(x-\mu)^2}{2\sigma^2}} + e^{\frac{-(x+\mu)^2}{2\sigma^2}}\right) \quad (2)$$

where $+\mu$ is the expected received amplitude of +1 data bits; $-\mu$ is the expected received amplitude of −1 data bits; and $\sigma^2$ is the noise power affecting the data bits (with the result that $\sigma$ should be the standard deviation of the received amplitude of the +1 or −1 data bits). It can be shown that the second order moment $M_2$ (e.g. variance) of the PDF given by equation (2) is $$M_2 = \sigma^2 + \mu^2 \quad (3)$$

In other words, the second order moment $M_2$ of the total distribution of all received data bit amplitudes (both +1 and −1) is equal to the sum of the noise power $\sigma^2$ affecting the data bits and the squared expected received amplitude $\mu^2$ of the data bits. Using a moment generating function, M, for the PDF given by equation (2), $$M = \frac{1}{2\sigma\sqrt{2\pi}}\left(\int_{-\infty}^{+\infty}\left(e^{\frac{-(x-\mu)^2}{2\sigma^2}} + e^{\frac{-(x+\mu)^2}{2\sigma^2}}\right)e^{vx} \cdot dx\right) \quad (4)$$

where v is an arbitrary real number. Integrating equation (4) gives $$M = \frac{1}{2}\left(e^{\frac{\sigma^2 v^2}{2}+\mu v} + e^{\frac{\sigma^2 v^2}{2}-\mu v}\right) \quad (5)$$

The nth order non-centred moment $M_n$, is given by $$\left.\frac{d^n M}{dv^n}\right|_{v=0} \quad (6)$$

with the result that the fourth order moment from equation (5) gives $$\frac{d^4 M}{dv^4} = \frac{1}{2}\left[\begin{array}{l}3\sigma^2\left(\sigma^2 e^{\frac{\sigma^2 v^2}{2}+\mu v} + 2(\sigma^2 v + \mu)^2 e^{\frac{\sigma^2 v^2}{2}+\mu v} + \right. \\ \left. \sigma^2 e^{\frac{\sigma^2 v^2}{2}-\mu v} + 2(\sigma^2 v - \mu)^2 e^{\frac{\sigma^2 v^2}{2}-\mu v}\right) + \\ (\sigma^2 v + \mu)^4 e^{\frac{\sigma^2 v^2}{2}+\mu v} + (\sigma^2 v - \mu)^4 e^{\frac{\sigma^2 v^2}{2}-\mu v}\end{array}\right] \quad (7)$$

-continued $$\Rightarrow \left.\frac{d^4 M}{d v^4}\right|_{v=0} = M_4 = 3\sigma^4 + 6\sigma^2\mu^2 + \mu^4$$

From equations (1), (3) and (7), it follows that $$\frac{M_2}{M_4} = \frac{\lfloor 1 + 2[\mathrm{erf}^{-1}(1-2BER)]^2 \rfloor 2[\mathrm{erf}^{-1}(1-2BER)]^2}{3 + 12[\mathrm{erf}^{-1}(1-2BER)]^2 + 4[\mathrm{erf}^{-1}(1-2BER)]^4} \quad (8)$$

In other words, the ratio of the second order moment $M_2$ to the fourth order moment $M_4$ is a function of BER and therefore indicative of signal quality. So, referring again to FIG. 1, the amplitude of the data bits of the power control commands received by the receiver 13 over the downlink 11 during the out of synchronisation procedure of the UMTS network is sampled for a period of time by the DSP 14. The period is long enough to collect a statistically significant number of amplitudes, e.g. between around 1 ms and 1 s. For example, for a data rate of 15 kbps, the sampling period may be 16 ms, with the result that the amplitude of 240 data bits is sampled during the period. The DSP 14 determines the second order moment $M_2$ and fourth order moment $M_4$ of the sampled amplitudes and estimates signal quality by determining the ratio of the derived second order moment $M_2$ to the derived fourth order moment $M_4$.

Figure 3:
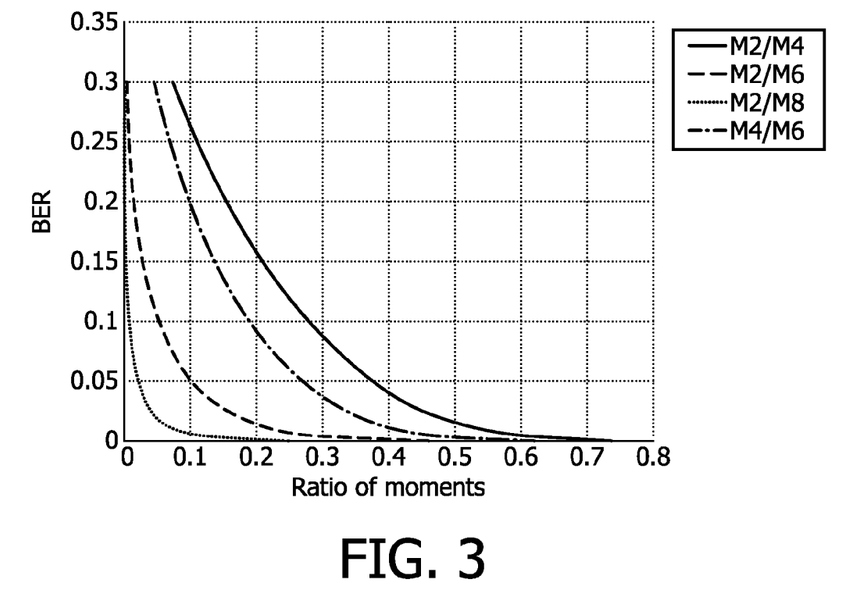
FIG. 3 is a graphical representation of actual BER against ratios of even order moments of distributions of sampled amplitudes of data bits received over the communication system of FIG. 1.

The relationship between actual BER of the data bits of the power control commands and the ratio of the second order moment $M_2$ to the fourth order moment $M_4$ of the sampled amplitudes is curvilinear, as shown in FIG. 3. So, the ratio can be made use of as it stands for estimating signal quality. For example, in one embodiment, the DSP 14 can switch off the transmitter 15 when the ratio is over a first threshold value, e.g. around 0.074 (corresponding to BER of around 30%), and switch the transmitter on again when the ratio is below a second threshold value, e.g. 0.15 (corresponding to a BER of around 20%). However, in another embodiment, the DSP 14 has a look up table of BER values for different ratios of second order moment $M_2$ to fourth order moment $M_4$. Once the ratio has been derived for the data bits of the received power control commands, the DSP 14 compares it to one or more ratios in the look up table to derive a BER value for the power control commands. Additionally, interpolation can be used to derive a more accurate value of BER based on the BER values in the look-up table.

Whilst the invention has been described so far in relation to an out of synchronisation procedure of a UMTS network, it is not limited to this. The invention can be applied to any communication system in which it is possible to sample magnitudes of symbols received in a signal and desired to estimate the quality of the signal. In particular, rather than sampling the amplitude of data bits received in a signal, an absolute magnitude, a differential magnitude, a phase, a phase difference or some measure of signal strength might be sampled, according to the nature of the particular communication system.

Referring to FIG. 3, other ratios between even order moments of the distribution of the sampled amplitudes of the data bits of the power control commands also have good curvilinear relationships with BER. So, in other embodiments of the invention, other ratios, such as the ratio of the second order moment $M_2$ to the sixth order moment $M_6$; the ratio of the second order moment $M_2$ to the eighth order moment $M_8$; or the ratio of the fourth order moment $M_4$ to the eighth order moment $M_8$ of a distribution of sampled magnitudes of symbols received in a signal can be used to estimate signal quality. Again, these ratios can be used alone as an indication of signal quality or to derive a conventional signal quality parameter, such as BER, using a look-up table or such like.

In some circumstances, the PDF of the amplitudes of the data bits is not symmetric, such as the PDF given by equation (2), but is asymmetric, e.g. when there are different numbers of +1 data bits and −1 data bits. In this case, referring to FIG. 4, ratios between odd order moments of the distribution of the sampled amplitudes of the data bits of the power control commands have a good curvilinear relationship with BER. So, in other embodiments of the invention, yet other ratios, such as the ratio of the first order moment $M_1$ to the third order moment $M_3$; the ratio of the first order moment $M_1$ to the fifth order moment $M_5$; or the ratio of the third order moment $M_3$ to the fifth order moment $M_5$ of a distribution of sampled magnitudes of symbols received in a signal can be used to estimate signal quality. Yet again, these ratios can be used alone as an indication of signal quality or to derive a conventional signal quality parameter, such as BER, using a look-up table or such like.

Figure 4:
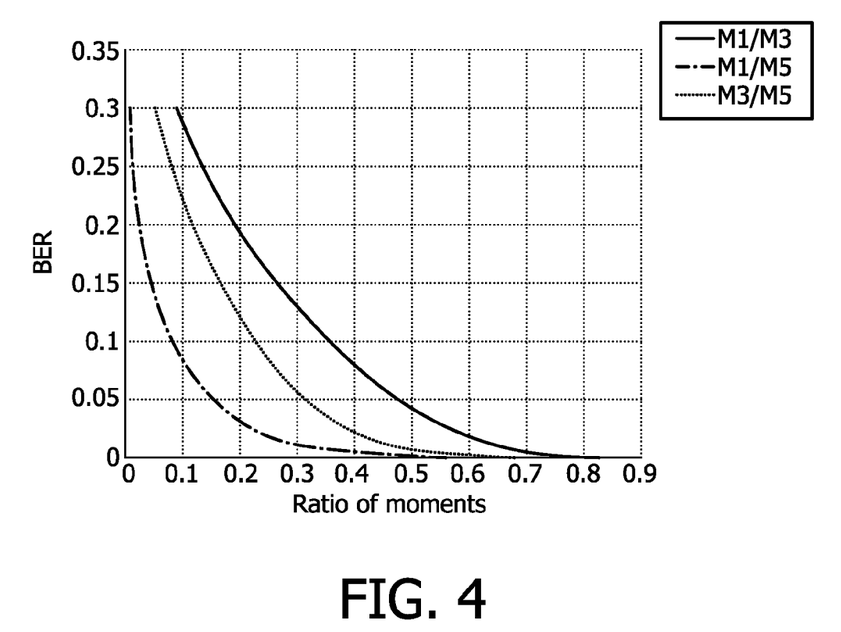
FIG. 4 is a graphical representation of actual BER against ratios of odd order moments of distributions of sampled amplitudes of data bits received over the communication system of FIG. 1.

Looking at FIGS. 3 and 4 in more detail, it can be appreciated that larger differences between the orders of the moments of the ratios provide greater sensitivity at lower values of BER. For example, the ratio of the second order moment $M_2$ to the sixth order moment $M_6$ is more sensitive at lower values of BER than the ratio of the second order moment $M_2$ to the fourth order moment $M_4$ and the ratio of the fourth order moment $M_4$ to the sixth order moment $M_6$. Likewise, the ratio of the second order moment $M_2$ to the eighth order moment $M_8$ is more sensitive at lower values of BER than the ratio of the second order moment $M_2$ to the sixth order moment $M_6$. However, calculation of higher order moments is more computationally demanding. So, in another embodiment of the invention, the DSP 14 increases the difference between the orders of the moments of the ratio as the signal quality increases, e.g. as the derived value of BER decreases.

Whilst the ratios between any two even order moments and the ratios between any two odd ordered moments are independent of the degree of asymmetry of the PDF, the value of any odd ordered moment itself increases with increasing asymmetry of the PDF. So, in another embodiment of the invention, the DSP 14 calculates a value for an odd ordered moment of the distribution of sampled amplitudes of the power control commands, e.g. the third order moment (often referred to as skew), and selects either a ratio between even order moments or a ratio between odd order moments for use in the signal quality estimation based on the value of the calculated value of the odd order moment.

Figure 5:
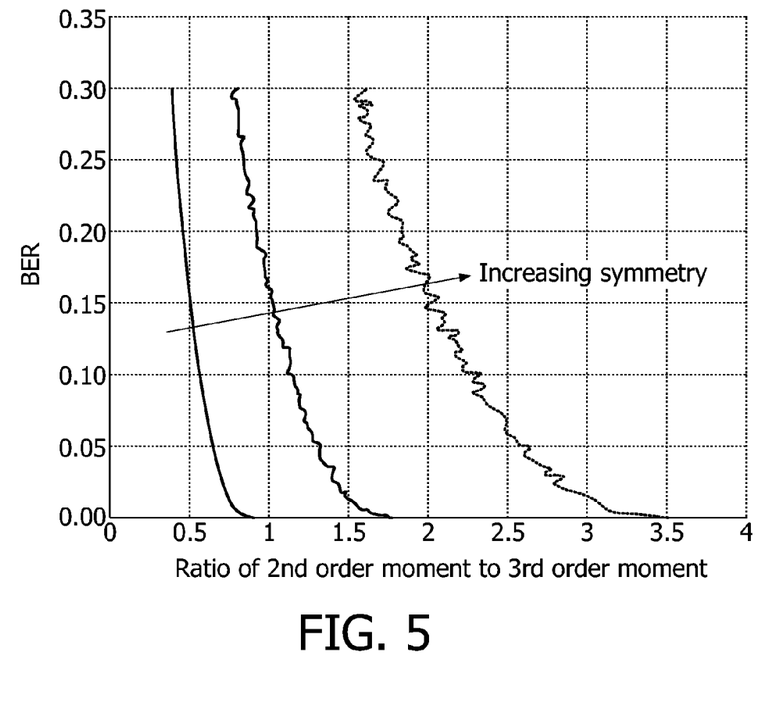
FIG. 5 is a graphical representation of actual BER against a ratio of a second order moment to a third order moment of distributions of sampled amplitudes of data bits received over the communication system of FIG. 1.

Similarly, referring to FIG. 5, ratios between one odd order moment and one even order moment of the distribution of sampled amplitudes of the power control commands vary depending on the degree of asymmetry of the PDF. So, such a ratio can also be used to estimate signal quality, in the same way as the ratios described above. Furthermore, in another embodiment of the invention, the DSP 14 can derive a ratio between one odd order moment and one even order moment of the distribution of sampled amplitudes of the power control commands, e.g. the ratio of the second order moment $M_2$ to the third order moment $M_3$, and select either a ratio between even order moments or a ratio between odd order moments for use in the signal quality estimation based on the degree of asymmetry of the PDF indicated by the derived ratio between one odd order moment and one even order moment. For example, if the ratio of the second order moment $M_2$ to the third order moment $M_3$ is less than say around 1, the PDF is fairly asymmetric and the DSP can select a ratio between odd ordered moments for use in the signal quality estimation. If the ratio of the second order moment $M_3$ to the third order moment $M_3$ is greater than say around 1, the PDF is fairly symmetric and the DSP can select a ratio between even ordered moments for use in the signal quality estimation.

Figure 6:
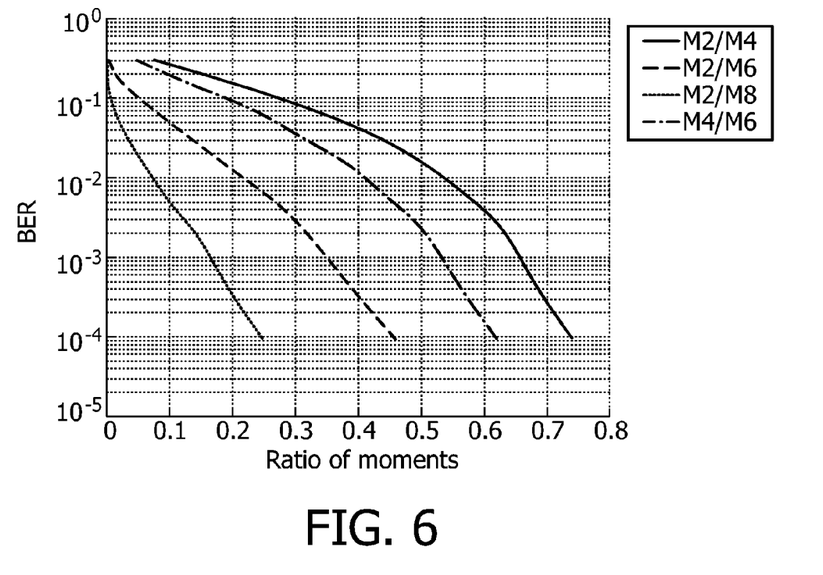
FIG. 6 is a graphical representation of logarithmic actual BER against ratios of even order moments of distributions of sampled amplitudes of data bits received over the communication system of FIG. 1.
Figure 7:
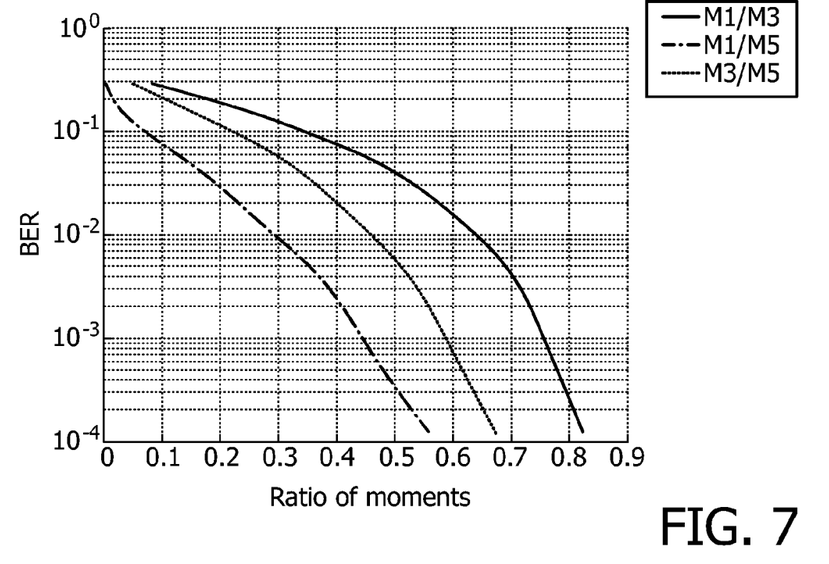
FIG. 7 is a graphical representation of logarithmic actual BER against ratios of odd order moments of distributions of sampled amplitudes of data bits received over the communication system of FIG. 1.

Referring to FIGS. 6 and 7, the relationships between certain ratios of even order moments and logarithmic BER and the relationships between certain ratios of odd order moments and logarithmic BER are fairly linear. In other embodiments of the invention, the DSP 14 therefore compares the derived ratio to a look up table of logarithmic BER values for different ratios to derive a BER value for the power control commands. Interpolation between such logarithmic BER values can be more accurate and simpler than interpolation between non-logarithmic BER values, due to the more linear relationship of the ratios to the logarithmic BER values. Furthermore, a more linear relationship can reduce the number of values of the ratio which need to be stored in the look-up table. In particular, it can be seen from FIGS. 6 and 7 that ratios between moments having larger difference in order have more linear relationships with logarithmic BER than ratios between moments having smaller difference in order. For example, the ratio of the second order moment $M_2$ to the eighth order moment $M_8$ shown in FIG. 6 is almost exactly linearly related to logarithmic BER, whilst the ratio of the second order moment $M_2$ to the fourth order moment $M_4$ shown in FIG. 6 still has a fairly curvilinear relationship with logarithmic BER. The ratio of the second order moment $M_2$ to the eighth order moment $M_8$ is therefore particularly useful for indicating signal quality using a look-up table of logarithmic BER values for different ratios.

The accuracy of the BER estimate described above can also vary according to the actual value of BER. In more detail, combining equations (5) and (7) gives a quadratic expression $$2(\sigma^2)^2 - 4M_2\sigma^2 - M_2^2 + M_4 = 0 \quad (9)$$

Using the lower root of equation (9), as the higher root will be greater than $M_2$ and is therefore meaningless, gives $$\sigma^2 = M_2 - \frac{1}{2}\sqrt{6M_2^2 - 2M_4} \quad (10)$$

And we already know from equation (3) that $$\mu = \sqrt{M_2 - \sigma^2} \quad (11)$$

Inserting the relationships given in equations (10) and (11) in equation (1) gives $$BER = \frac{1}{2}\left(1 - \text{erf}\left(\sqrt{\frac{6M_2^2 - 2M_4}{2(2M_2 - \sqrt{6M_2^2 - 2M_4})}}\right)\right) \quad (12)$$

Figure 8:
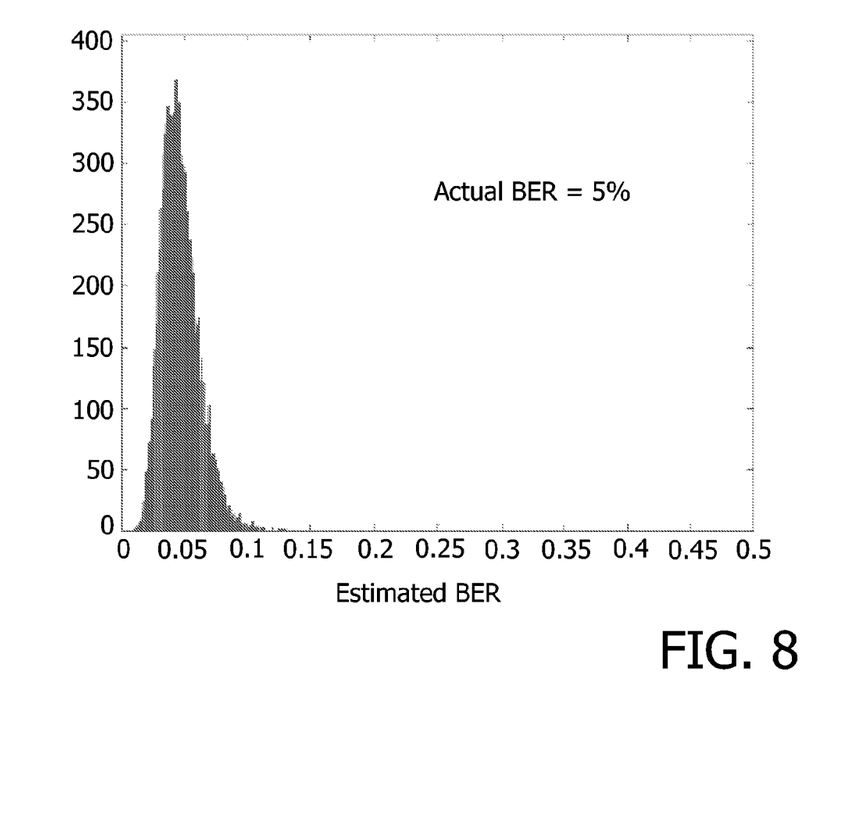
FIG. 8 is a histogram of an estimate of the BER of data bits received over the communication system of FIG. 1, where the actual value of BER is 5%.
Figure 9:
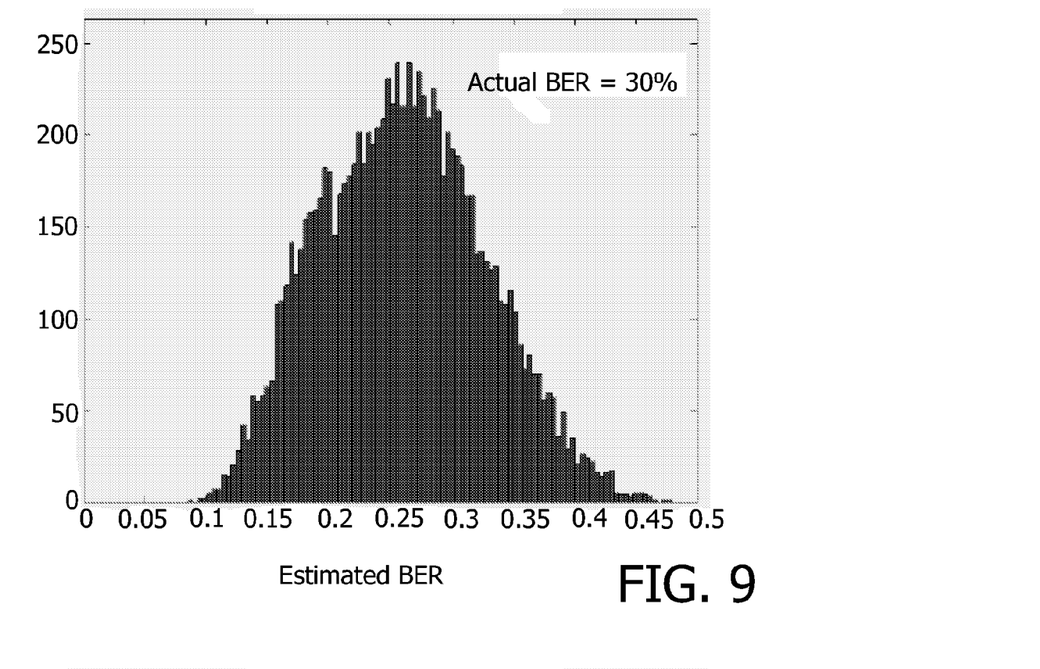
FIG. 9 is a histogram of an estimate of the BER of data bits received over the communication system of FIG. 1, where the actual value of BER is 30%.

So, BER can be estimated as a direct function of the second order moment $M_2$ and fourth order moment $M_4$ of the sampled data bit amplitudes. Here, the BER of the distribution of sampled data bit amplitudes collected during the 16 ms sampling period is first determined when the power control commands have an actual BER of 5%. The determination is repeated a large number of times and a histogram of the calculated BERs is shown in FIG. 8. The BER of the distribution of sampled data bit amplitudes collected during the 16 ms sampling period is then determined a number of times when the power control commands have an actual BER of 30%. A histogram of these calculated BERs is shown in FIG. 9. It can be seen that the determined BERs have a far greater spread when the actual BER is 30% than when the actual BER is 5%.

Figure 10:
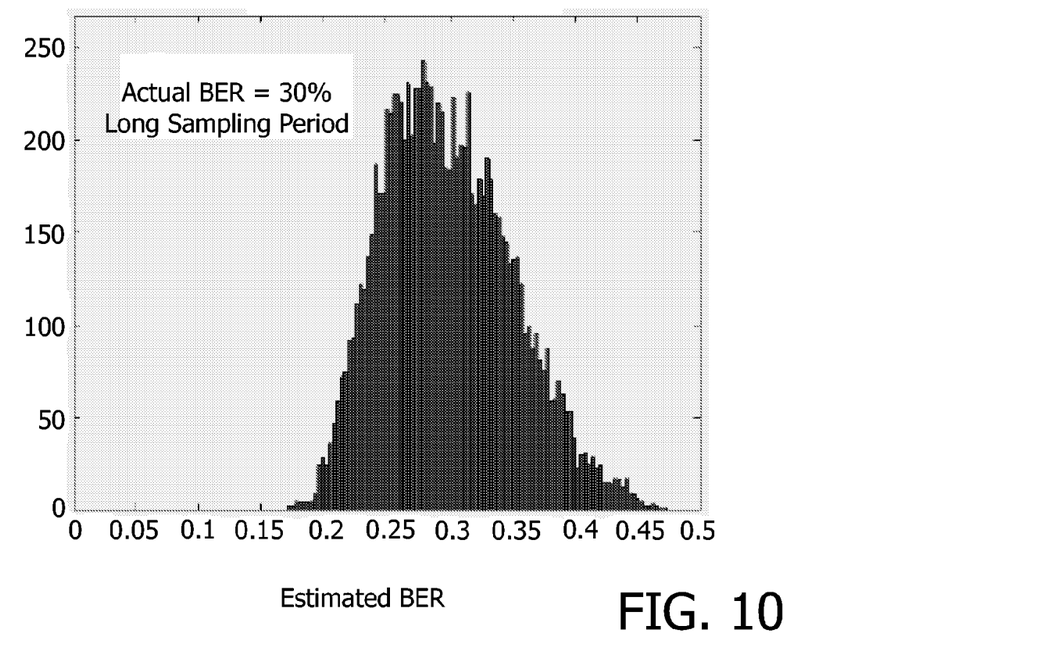
FIG. 10 is a histogram of an estimate of the BER of data bits received over the communication system of FIG. 1, when the actual value of BER is 30% and a sampling period is extended from 16 ms to 0.1s.

BER is also determined a number of times for a distribution of sampled amplitudes of the power control commands collected during a 1 s sampling period, again when the actual BER is 30%. A histogram of these determined BERs is shown in FIG. 10. It can be seen that this histogram has a narrower spread than the histogram of BER estimates when the actual BER is 30% using a 16 ms sampling period shown in FIG. 9. From this, the applicants have identified that the accuracy of the signal quality estimation increases with the length of the sampling period. In one embodiment of the invention, the DSP 14 therefore monitors the derived ratio and, as the signal quality decreases, e.g. the derived ratio increases, the DSP 14 extends the sampling period. This maintains the accuracy of the signal quality estimate for lower signal qualities.

Figure 11:
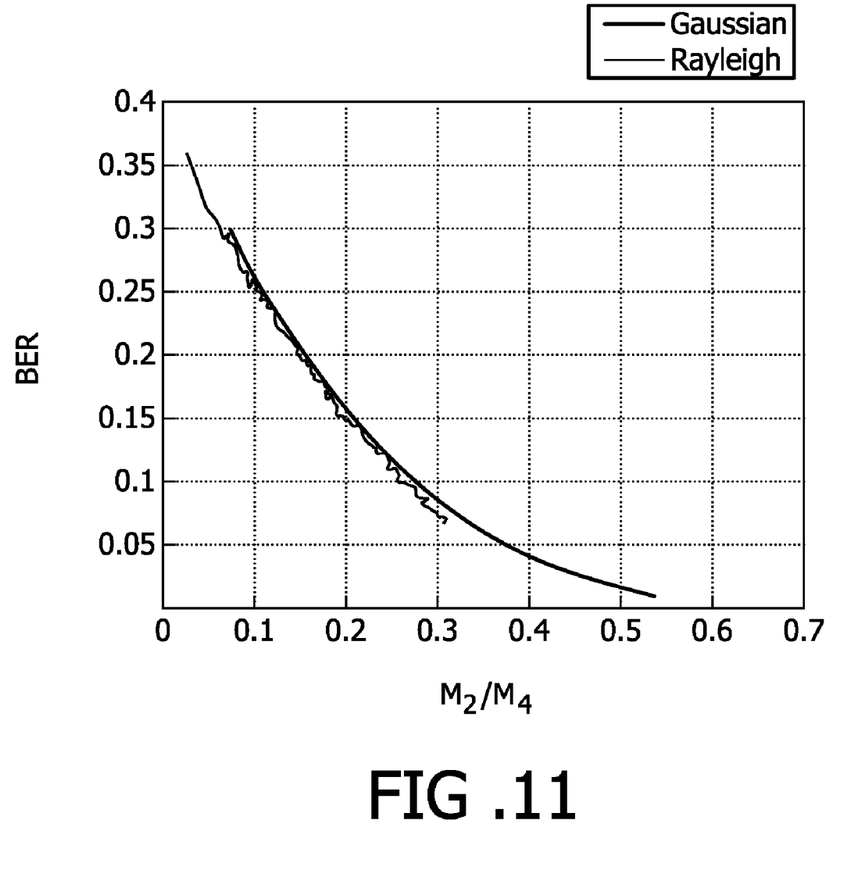
FIG. 11 is a graphical representation of actual BER against a ratio of a second order moment to a fourth order moment of a distribution of sampled amplitudes of data bits received over the communication system of FIG. 1 in the presence of Gaussian noise and Rayleigh distributed fading.

For all of the above results, the noise applied to the generated signal by the modelled communication system is Gaussian, as typical in many communication systems. However, similar results are obtained by applying Rayleigh distributed fading to the signal. In particular, FIG. 11 shows the relationship between the derived ratios of second order moment $M_2$ to fourth order moment $M_4$ against actual BER for a signal affected by Gaussian noise (smooth line) and for a signal affected by Rayleigh distributed fading tagged line). It can be seen that the relationships are very similar to one another over a range of BERs encountered in most communication systems. So, the invention is equally applicable to communication systems affected by Rayleigh distributed fading as those affected by Gaussian noise. In particular, the invention is useful for wireless/radio communication systems.

So far we have considered the derivation of BER. However, other signal quality parameters can be derived from the ratios described above. For example, equation (12) can be straight-forwardly re-written as $$SNR = \frac{\sqrt{6M_2^2 - 2M_4}}{2M_2 - \sqrt{6M_2^2 - 2M_4}} \quad (13)$$

So, signal to noise ratio (SNR) can also be expressed as a direct function of the second order moment $M_2$ and fourth order moment $M_4$ of the sampled data bit amplitudes. In another embodiment, the DSP 14 therefore has a look-up table of SNR values for the different ratios. Once the ratio has been derived for the received signal, the DSP 14 compares it to ratios in the look up table of SNR values to derive a SNR value for the signal.

In particular, it can be useful to estimate the SNR of each multi-path component of a received signal (or each tap of a tapped delay line model). In another embodiment of the invention, the DSP 14 therefore receives a signal and applies one or more delays to the signal to generate one or more signal taps. The DSP 14 samples the amplitude of the data bits in each signal tap and derives the ratio of second order moment $M_2$ to fourth order moment $M_4$ for each signal sample. SNR can then be estimated for each signal tap from the derived ratios and the look-up table of SNR values for different ratios.

In the preceding description of the example embodiments it is assumed that the received data symbol amplitude has been normalised to unity (i.e. $\mu=1$). This would be required in order that the ratio of moments does not depend on the signal amplitude. It can easily be shown that an appropriate normalisation factor can be derived. One example would be to divide the received signal values by a factor $\alpha$ which can be derived using $$a^2 = \frac{1}{2}\sqrt{6(M'_2)^2 - 2M'_4}$$

(based on equations 10 and 11) where $M'_2=E[x^2]$ and $M'_4=E[x^4]$ are respectively the moments computed as expectation values of the square and fourth power of the received signal without any normalisation. Alternatively, rather than applying it to the data before computing the moments, such a normalisation may be included when the ratio of moments is calculated. So, for example instead of $M_2/M_4$ an embodiment could use $$(M'_2/M'_4)\frac{1}{2}\sqrt{6(M'_2)^2 - 2M'_4}.$$

Another possibility is to employ the ratios of powers of moments. For example instead of $M_2/M_4$ an embodiment could use $(M'_2)^2/M'_4$ (the value of which is independent of any scaling of the data). This principle can be extended in a more general way to consider powers of ratios of the form $[(M'_i)^{1/i}/(M'_j)^{1/j}]^k$ where k can be chosen for convenience of computation. More generally it would be possible to consider the ratio of any functions of moments i.e. $F_1[M'_i]/F_2[M'_j]$ or the ratio of functions of more than one moment. Such functions would preferably be chosen for ease of computation, and suitability for use in a look-up table.

The described embodiments of the invention are only examples of how the invention may be implemented. Modifications, variations and changes to the described embodiments will occur to those having appropriate skills and knowledge. These modifications, variations and changes may be made without departure from the spirit and scope of the invention defined in the claims and its equivalents.

The invention claimed is:

1. An apparatus for estimating signal quality, the apparatus comprising:
a receiver for sampling magnitudes with which symbols of a signal are received; and
a processor for determining a ratio $F_1/F_2$, where $F_1$ is a function of a first moment $M_i$ of order i of the sampled magnitudes, $F_2$ is a function of a second moment $M_j$ of order j of the sampled magnitudes, i≠j, and $F_1$ and $F_2$ are non-identical, and for estimating signal quality of the signal from the determined ratio, wherein the processor is configured to vary at least one of the orders i,j of the first and second moments according to at least one of: a degree of asymmetry of a distribution of the sampled magnitudes; and the estimated signal quality.

2. The apparatus of claim 1, wherein $F_1[M_i]=M_i^{k/i}$ and $F_2[M_j]=M_j^{k/j}$ and k is any real number.

3. The apparatus of claim 1, wherein $M_i$ is computed as an expectation value of an ith power of the signal and $M_j$, is computed as an expectation value of a jth power of the signal.

4. The apparatus of claim 1, wherein at least one of $F_1$ and $F_2$ includes a normalization factor.

5. The apparatus of claim 1, wherein the ratio $F_1[M_i]/F_2[M_j]$ comprises a ratio between the moment $M_i$ and the moment $M_j$.

6. The apparatus of claim 5, wherein the moments $M_i$ and $M_j$ are both even order moments.

7. The apparatus of claim 5, wherein the moments $M_i$ and $M_j$ are both odd order moments.

8. The apparatus of claim 6, wherein $M_i$ comprises a second order moment and $M_j$ comprises a fourth order moment.

9. The apparatus of claim 1, wherein the processor is configured to estimate signal quality by deriving a value for a signal quality parameter from the ratio.

10. The apparatus of claim 1, further comprising a look-up table of signal quality parameter values for different ratios, wherein the processor is configured to derive the signal quality parameter value by comparing the derived ratio to the one or more of the ratios in the look-up table.

11. The apparatus of claim 10, wherein the processor is configured to interpolate between signal quality parameter values in the look-up table to derive the signal quality parameter value.

12. The apparatus of claim 10, wherein the signal quality parameter values in the look-up table are spaced logarithmically.

13. The apparatus of claim 9, wherein the signal quality parameter is one of: bit error rate; signal to noise ratio; block error rate; and packet error rate.

14. The apparatus of claim 1, wherein the receiver is configured to sample the magnitudes of all the symbols of a stream of symbols in the signal.

15. The apparatus of claim 1, wherein the receiver is configured to sample the magnitudes of symbols received during a period of time.

16. The apparatus of claim 15, wherein the processor is configured to vary the period of time according to the estimated signal quality.

17. The apparatus of claim 1, wherein the symbols are bits.

18. The apparatus of claim 1, wherein the magnitude is amplitude.

19. A method of estimating signal quality, the method comprising:
sampling magnitudes at which symbols of a signal are received;
determining a ratio $F_1/F_2$, where $F_1$ is a function of a first moment $M_i$ of order i of the sampled magnitudes, $F_2$ is a function of a second moment $M_j$ of order j of the sampled magnitudes, i≠j, and $F_1$ and $F_2$ are non-identical;
varying at least one of the orders i,j of the first and second moments according to at least one of: a degree of asymmetry of a distribution of the sampled magnitudes and the estimated signal quality; and
estimating signal quality of the signal from the determined ratio.

20. The method of claim 19, wherein $F_1[M_1]=M_i^{k/i}$ and $F_2[M_j]=M_j^{k/j}$ and k is any real number.

21. The method of claim 19, wherein $M_i$ is computed as the expectation value of the ith power of the signal and $M_j$ is computed as the expectation value of the jth power of the signal.

22. The method of claim 19, wherein at least one of $F_1$ and $F_2$ includes a normalisation factor.

23. The method of claim 19, wherein the ratio $F_1[M_1]/F_2[M_j]$ comprises a ratio between the first moment $M_i$ and the second moment $M_j$.

24. The method of claim 23, wherein the moments are both even order moments.

25. The method of claim 23, wherein the moments are both odd order moments.

26. The method of claim 24, wherein the first moment is a second order moment and the second moment is a fourth order moment.

27. The method of claim 19, comprising estimating signal quality by deriving a value for a signal quality parameter from the ratio.

28. The method of claim 19, comprising deriving the signal quality parameter value by comparing the derived ratio to one or more ratios in a look-up table of signal quality parameter values for different ratios.

29. The method of claim 28, wherein the comparison includes interpolating between signal quality parameter values in the look-up table to derive the signal quality parameter value.

30. The method of claim 28, wherein the signal quality parameter values in the look-up table are spaced logarithmically.

31. The method of claim 27, wherein the signal quality parameter is one of: bit error rate; signal to noise ratio; block error rate; and packet error rate.

32. The method of claim 19, comprising sampling the magnitude of all the symbols of a stream of symbols in the signal.

33. The method of claim 19, comprising sampling the magnitude of symbols received during a period of time.

34. The method of claim 33, comprising varying the period of time according to the estimated signal quality.

35. The method of claim 19, wherein the symbols are bits.

36. The method of claim 19, wherein the magnitude is amplitude.

37. A non-transitory computer readable storage medium comprising instructions configured to cause a processor to implement a method that includes:
   sampling magnitudes at which symbols of a signal are received;
   determining a ratio $F_1/F_2$, where $F_1$ is a function of a first moment $M_i$ of order i of the sampled magnitudes, $F_2$ is a function of a second moment $M_j$ of order j of the sampled magnitudes, $i \neq j$, and $F_1$ and $F_2$ are non-identical;
   varying at least one of the orders i,j of the first and second moments according to at least one of: a degree of asymmetry of a distribution of the sampled magnitudes and the estimated signal quality; and
   estimating signal quality of the signal from the determined ratio.

* * * * *